… … …    AR    3,780,040

United States Patent Office 3,780,040
Patented Dec. 18, 1973

3,780,040
2-SUBSTITUTED-3,4-DIHYDROQUINAZOLINES
Richard A. Schnettler, 6234 W. Donges Lane, Brown Deer, Wis. 53223, and John T. Suh, 3709 W. Scenic Drive, 111 N., Mequon, Wis. 53092
No Drawing. Filed June 2, 1972, Ser. No. 259,076
Int. Cl. C07d 99/06
U.S. Cl. 260—256.5                         5 Claims

ABSTRACT OF THE DISCLOSURE

The 2-substituted-3,4-dihydroquinazolines and their pharmaceutically acceptable acid addition salts are useful antihypertensive agents. A compound disclosed is 2-[N-(N'-2-thienoylpiperazino)]-3,4-dihydroquinazoline hydroiodide hydrate.

DETAILED DESCRIPTION

The compounds of the present invention have the following formula

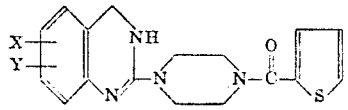

in which X and Y are selected from hydrogen, hydroxy, halogen, $CF_3$, alkyl of 1 to 4 carbon atoms or an alkoxy of 1 to 4 carbon atoms, especially methoxy or ethoxy.

BACKGROUND OF THE INVENTION

U.S. Pats. Nos. 3,496,179 and 3,609,152 disclose 2-amino-3,4-dihydroquinazolines which are antihypertensive agents and an article by H. R. Rodriguez et al., J. Org. Chem., 33, 670 (1968) discloses the compound 2-amino-4,5-dihydro-7,8-dimethoxy-3H-1,3-benzodiazepine.

PREPARATION OF THE COMPOUNDS

The compounds of the present invention are readily prepared from 2-aminobenzylamine of the formula

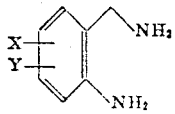

which are known compounds.

Representative of the amines that may be used as starting materials are the following:

2-aminobenzylamine,
2-amino-4,5-dimethoxybenzylamine,
2-amino-4,5-dichlorobenzylamine,
2-amino-4,5-trifluoromethylbenzylamine,
2-amino-4,5-dimethylbenzylamine, and
2-amino-3,6-dichlorobenzylamine.

The compounds of the invention are conveniently prepared by reacting the selected 2-aminobenzylamine with carbon disulfide in ethanol to form the corresponding 3,4-dihydro-2(1H)-quinazolinethione which when treated with methyliodide in a mixture of methanol and ethanol forms the corresponding 2-methylmercapto-3,4-dihydroquinazoline hydroiodide. The thus obtained hydroiodide is then dissolved in anhydrous acetonitrile and reacted with N-2-thienoylpiperazino under reflux conditions in a suitable solvent such as acetonitrile to form the desired compound.

The described process may be illustrated as follows:

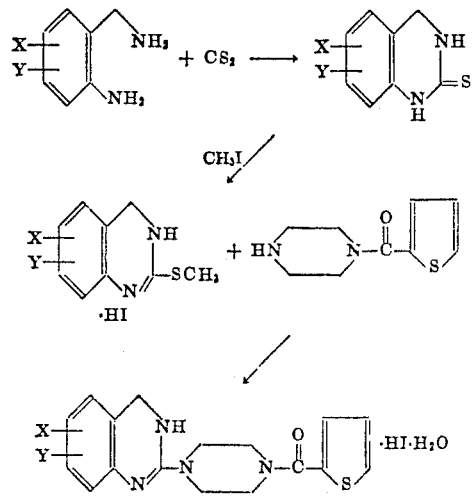

in which X and Y are as previously defined.

Among the compounds which may be prepared by the described process are the following:

2-[N-(N'-2-thienoylpiperazino)]-3,4-dihydroquinazoline hydroiodide hydrate,
6,7-dimethoxy-2-[N-(N'-2-thienoylpiperazino)]-3,4-dihydroquinazoline hydroiodide,
6,8-dichloro-2-[N-(N'-2-thienoylpiperazino)]-3,4-dihydroquinazoline hydroiodide, and
7,8-dihydroxy-2-[N-(N'-2-thienoylpiperazino)]-3,4-dihydroquinazoline hydroiodide.

The compounds in which X and/or Y are hydroxy may be readily prepared from the corresponding compounds in which X and Y are aralkoxy or alkoxy by conventional procedures.

Acid addition salts of the compounds of the present invention may be conveniently produced by contacting the free base with a suitable acid such as sulfuric acid, hydrochloric acid, succinic acid, tartaric acid, benzoic acid or fumaric acid.

The thiocyanic acid addition salts of the compounds when condensed with formaldehyde form resinous materials useful as pickling agents according to U.S. Pats. Nos. 2,425,320 and 2,606,155. The compounds also form fluosilicic acid addition salts which are useful as mothproofing agents according to U.S. Pats. Nos. 1,915,334 and 2,075,359.

The compounds of the invention are pharmacologically active. For example, the compound 2-[N-(N'-2-thienoylpiperazino)]-3,4-dihydroquinazoline hydroiodide hydrate, when evaluated in mouse behavioral studies at intraperitoneal doses of 30 to 300 mg./kg., was found to produce a central nervous system depression. The mouse behavioral studies also indicated that the compound was relatively safe and possessed an $LD_{50}$ in excess of 75 mg./kg. of body weight. The behavioral studies were conducted essentially in accordance with the procedure outlined by S. Irwin in "Animal and Clinical Pharmacologic Techniques in Drug Evaluation," J. H. Nodine and P. E. Siegler, Ed., Year Book Medical Publishers, Inc., 1964. In the standard anesthetized, vagotomized cat preparation the forementioned compound was found at intravenous doses of 3 and 10 mg./kg. to substantially decrease the blood pressure of the animals.

When intended for pharmaceutical use, the compounds are preferably combined with one or more suitable pharmaceutical diluents and additives and formed into unit dosage forms for oral or parenteral administration such as tablets, capsules and solutions.

The following examples are presented to illustrate this invention:

Example.—3,4-dihydro-2(1H)-quinazolinethione

To a cool solution (icebath) of 13.9 g. (0.18 mole) carbon disulfide in 90 ml. absolute alcohol is slowly added (30 minutes) 8.9 g. (0.073 mole) 2-aminobenzylamine. The mixture is stirred at room temperature for 15 hours and then refluxed for 24 hours, cooled, and the solid collected to give 3,4-dihydro-2(1H)-quinazolinethione as a white solid, M.P. 214–217°.

Example 2.—2-methylmercapto-3,4-dihydroquinazoline hydroiodide

A mixture of 6.6 g. (0.04 mole) 3,4-dihydro-2(1H)-quinazolinethione and 8.5 g. (0.06 mole) methyl iodide are refluxed with stirring for 2 hours. The solvent is evaporated and the residue triturated with diethyl ether to give 2-methylmercapto-3,4-dihydroquinazoline hydroiodide as a solid, M.P. 231–235°.

Example 3.—2-[N-(N'-2-thienoylpiperazino)]-3,4-dihydroquinazoline hydroiodide hydrate In 20 ml. dry acetonitrile are refluxed 3.0 g. (0.01 mole) 2-methylmercapto-3,4-dihydroquinazoline hydroiodide and 3.9 g. (0.02 mole) N-2-thienoylpiperazine for 24 hours. The solvent is evaporated and the residue triturated with isopropanol to give a solid which on recrystallization from ethanol affords 2-[N-(N'-2-thienoylpiperazino)]-3-,4-dihydroquinazoline hydroiodide hydrate as white crystals, M.P. 237–239.5°.

*Analysis.*—Calcd. for $C_{17}H_{21}IN_4O_2S$ (percent): C, 43.23; H, 4.48; N, 11.86. Found (percent): C, 43.23; H, 4.50; N, 11.79.

EXAMPLE 4.—2-[N-(N'-2-thienoylpiperazino)]-3,4-dihydroquinazoline hydrochloride

In 200 ml. methanol is dissolved 2.0 g. 2-[N-(N'-2-thienoylpiperazino)]-3,4-dihydroquinazoline hydroiodide hydrate. The solution is treated with 200 ml. 5% potassium carbonate solution and extracted into chloroform. The choloform solution is washed with water, dried over sodium sulfate and evaporated to give a glassy residue. Trituration with ethereal hydrochloric acid gives 2-[N-(N'-2-thienoylpiperazino)] - 3,4 - dihydroquinazoline hydrochloride, M.P. 253–255°.

We claim:

1. A compound selected from a compound of the formula

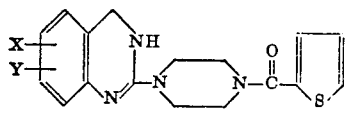

and pharmaceutically acceptable salts thereof, in which X and Y are hydrogen, hydroxy, halogen, $CF_3$, lower alkoxy of 1 to 4 carbon atoms or lower alkyl of 1 to 4 carbon atoms.

2. A compound of claim 1 in which X and Y are hydrogen or methoxy.

3. A compound of claim 1 in which X and Y are methoxy.

4. The compound of claim 1 which is 2-[N-(N'-2-thienoylpiperazino)]-3,4-dihydroquinazoline hydroiodide hydrate.

5. The compound of claim 1 which is 2-[N-(N'-2-thienoylpiperazino)]-3,4-dihydroquinazoline hydrochloride.

References Cited

UNITED STATES PATENTS

| | | | |
|---|---|---|---|
| 3,609,152 | 9/1971 | Hess et al. | 260—256.5 |
| 3,717,634 | 2/1973 | Wu et al. | 260—256.5 |

RICHARD J. GALLAGHER, Primary Examiner

U.S. Cl. X.R.

252—149; 260—251 QB; 424—152, 251